United States Patent [19]

Tanaka et al.

[11] Patent Number: 4,831,516
[45] Date of Patent: May 16, 1989

[54] DATA TRANSMISSION SYSTEM BETWEEN A MAIN CPU BOARD HAVING A WAIT SIGNAL GENERATING LATCH AND A PLURALITY OF CPU BOARDS

[75] Inventors: Kinzi Tanaka; Minoru Shigematsu, both of Kawasaki; Yoshiji Tanimoto; Minoru Okumura, both of Tokyo, all of Japan

[73] Assignees: Nitsuko Limited, Kanagawa; Nippon Telegraph and Telephone Corporation, Tokyo, both of Japan

[21] Appl. No.: 830,101

[22] Filed: Feb. 18, 1986

[30] Foreign Application Priority Data

| Mar. 18, 1985 | [JP] | Japan | 60-53813 |
| Mar. 18, 1985 | [JP] | Japan | 60-53814 |
| Mar. 18, 1985 | [JP] | Japan | 60-53815 |

[51] Int. Cl.⁴ .................. G06F 13/38; G06F 13/42
[52] U.S. Cl. ..................... 364/700; 379/165; 340/825.52; 340/825.03; 364/222.3; 364/242.1; 364/260.1; 364/284
[58] Field of Search ... 364/200 MS File, 900 MS File; 340/825.03, 825.07, 825.08, 825.5, 825.52; 379/155, 165, 166

[56] References Cited

U.S. PATENT DOCUMENTS

| 3,409,878 | 11/1968 | Lindinger et al. | 364/200 |
| 3,891,974 | 6/1975 | Coulter et al. | 364/200 |
| 4,145,739 | 3/1979 | Dunning et al. | 364/200 |
| 4,149,243 | 4/1979 | Wallis | 364/200 |
| 4,160,131 | 7/1979 | Kaul et al. | 370/58 |
| 4,296,466 | 10/1981 | Guyer et al. | 364/200 |
| 4,383,137 | 5/1983 | Aikawa et al. | 379/165 |
| 4,417,303 | 11/1983 | Korowitz et al. | 364/200 |
| 4,443,850 | 4/1984 | Harris | 364/200 |
| 4,495,571 | 1/1985 | Staplin, Jr. et al. | 364/200 |
| 4,506,324 | 3/1985 | Healy | 364/200 |
| 4,590,556 | 5/1986 | Berger et al. | 364/200 |
| 4,660,219 | 4/1987 | Tanaka et al. | 379/156 |

Primary Examiner—Raulfe B. Zache
Assistant Examiner—Thomas C. Lee
Attorney, Agent, or Firm—Burns, Doane, Swecker & Mathis

[57] ABSTRACT

A data transmission system between a main CPU and a plurality of sub-CPU's includes a data bus connected between them, a CPU select line for transmitting a CPU select signal from the main CPU to the sub-CPU's, a latch circuit for providing a wait signal to the main CPU upon write or read in the main CPU with respect to the sub-CPU's and a wait clear line connected between the respective CPU's to provide to the latch circuit a wait clear signal upon completion of input and output of the sub-CPU to release the waited state of the main CPU, the transmission system being thereby simplified to reduce installation space and wiring labor.

7 Claims, 4 Drawing Sheets

4,831,516

DATA TRANSMISSION SYSTEM BETWEEN A MAIN CPU BOARD HAVING A WAIT SIGNAL GENERATING LATCH AND A PLURALITY OF CPU BOARDS

BACKGROUND OF THE INVENTION

This invention relates to data transmission systems between a plurality of central processing units (CPU's).

The data transmission system of the type referred to is effective to be used for the data transmission between the respective CPU's incorporated in a key telephone system.

In general, the key telephone system must process various sorts of signals in a short time. To satisfy such demand, the system is so arranged that constituent hardwares are installed on a plurality of boards as divided according to their function respectively with a main CPU or a sub-CPU.

The conventional data transmission system, however, has been defective specifically in that latch and buffer stages must be provided to the respective boards which carry, in particular, the sub-CPU, so that the number of required components will have to be thereby increased. This renders the system to be expensive, and fails to minimize installation space. Furthermore, the system requires a plurality of command control lines, which disadvantageously involves a large wiring space and troublesome wiring work.

SUMMARY OF THE INVENTION

A primary object of the present invention is, therefore, to provide a data transmission system which can realize high speed transmission with a simple and inexpensive arrangement so that installation space and wiring labor can be minimized.

According to the present invention, this object can be attained by providing a transmission system which comprises a main CPU, a plurality of sub-CPU's, a data bus connected between the respective CPU's, a CPU select line for sending therethrough a CPU select signal from the main CPU to the respective sub-CPU's, a latch circuit for providing a wait signal to the main CPU itself upon write or read of the main CPU with respect to the sub-CPU's, and a wait clear line for providing therethrough to the latch circuit a wait clear signal indicative of completion of input and output of the sub-CPU to release the waited state of the main CPU, wherein data and command transmission is performed through the write or read of the main CPU.

Other objects and advantages of the present invention shall become clear from the following description of the invention detailed with reference to preferred embodiments illustrated in accompanying drawings.

Figure 1:
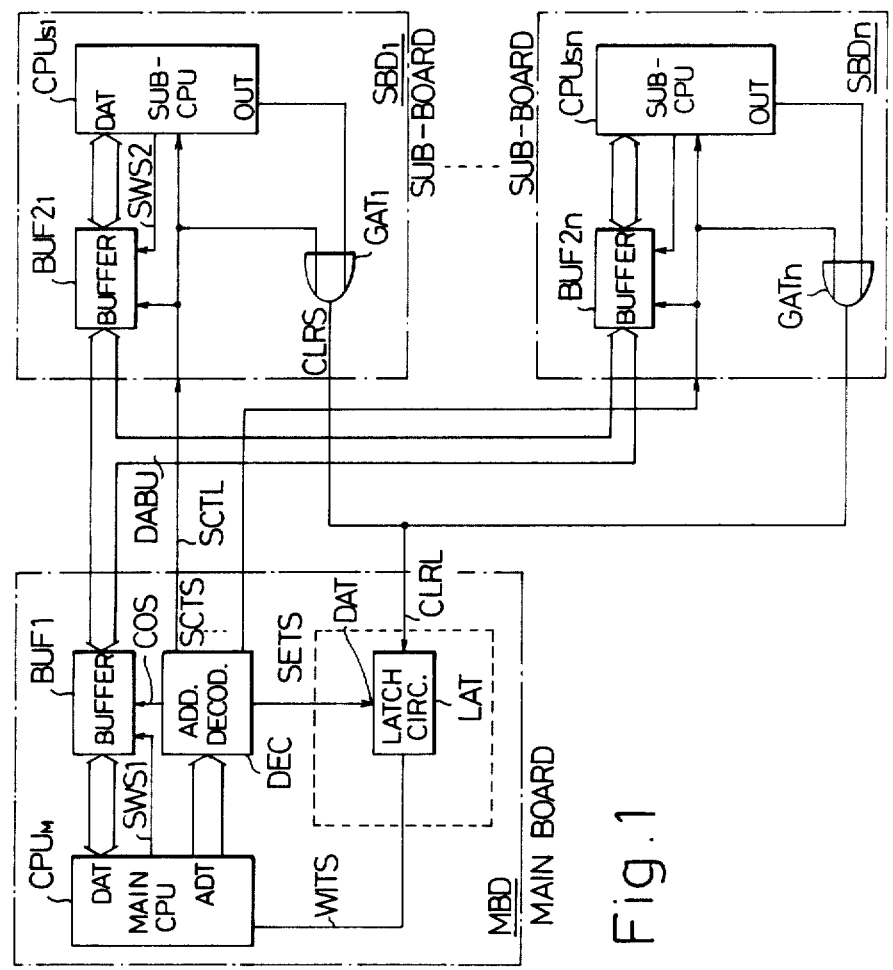
FIG. 1 is a schematic block diagram of a data transmission system according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DESCRIPTION OF PREFERRED EMBODIMENTS

Referring to the data transmission system of the present invention as shown in FIG. 1, a main $CPU_M$ is mounted on a main board MBD and a plurality of sub-CPU's, $CPU_{S1}$ to $CPU_{Sn}$ operatively associated with the main CPU are mounted respectively on each of sub-boards $SBD_1$ to $SBD_n$ which are connected to the main board MBD through a data bus DABU, a CPU select line SCTL and a wait clear line CLRL. In this case, the main CPU, $CPU_M$ mounted on the main board MBD is connected at its data terminal DAT to the data bus DABU through a bilateral buffer BUF1 and at its address terminal ADT to an address decoder DEC which generates a CPU select signal SCTS. When the main CPU, $CPU_M$ provides one of the addresses allocated every one of the sub-CPU's, $CPU_{S1}$ to $CPU_{Sn}$, the address decoder DEC activates the CPU select signal SCTS being provided to the addressed one of the sub-CPU's, $CPU_{S1}$ to $CPU_{Sn}$. On the main board MBD, the address decoder DEC further provides a wait set signal SETS to a data input terminal DAT of a latch circuit LAT which in turn provides a wait signal WITS to a wait terminal WIT of the main CPU, $CPU_M$.

Furthermore, the main CPU, $CPU_M$ provides to the bilateral buffer BUF1 a switching signal SWS1 for switching the signal transmission direction of the buffer BUF1 according to the data transmission or reception, while the address decoder DEC also provides to the buffer BUF1 a comman signal COS for causing signals to pass therethrough.

On the other hand, the sub-CPU's, $CPU_{S1}$ to $CPU_{Sn}$ on the sub-boards $SBD_1$ to $SBD_n$ are connected respectively at their data terminal DAT through each of bilateral buffers $BUF2_1$ to $BUF2_n$ to the data bus DABU to receive data therefrom, and at their output terminal OUT to one of the input terminals of OR gates $GAT_1$ to $GAT_n$ (or AND gates in negative logic), while the OR gates $GAT_1$ to $GAT_n$ are respectively connected at their other input terminal to the CPU select line SCTL to receive the CPU select signal SCTS and at their output terminal to the latch circuit LAT of the main board MBD to provide thereto a wait clear signal CLRS. The sub-CPU's, $CPU_{S1}$ to $CPU_{Sn}$ are further made to provide to associated ones of the bilateral buffers $BUF2_1$ to $BUF2_n$ a switching signal SWS2 for switching the signal transmission direction of the buffers $BUF2_1$ to $BUF2_n$ according to the data transmission or reception.

The operation of the data transmission system according to the present invention shall be explained as follows:

DATA TRANSMISSION FROM MAIN CPU TO SUB-CPU

I. The main CPU, $CPU_M$ specifies the address of one of the sub-CPU's, $CPU_{S1}$ to $CPU_{Sn}$ to write it and provides data of such a waveform as shown in FIG. 2(a) to the data bus DABU, and the CPU select signal SCTS is provided to the addressed sub-CPU. At the same time, the address decoder DEC provides the wait set signal SETS such as shown in FIG. 2(b) to the latch circuit LAT, through which the wait signal WITS such as shown in FIG. 2(c) is provided to the main CPU, $CPU_M$ so as to hold the main CPU, $CPU_M$ to a state in which the write has been performed, and the main CPU stops its operation.

II. Upon receipt of the CPU select signal SCTS, the addressed sub-CPU reads the data from the data bus DABU through the associated bilateral buffer BUF2.

III. Upon completion of the data read, the sub-CPU provides a completion signal from its output terminal OUT to the associated OR gate $GAT_1$ to $GAT_n$ which in turn transmits the wait clear signal CLRS such as shown in FIG. 2(d) to the latch circuit LAT on the main board MBD.

IV. The wait signal WITS is thereby cleared, the main CPU, $CPU_M$ resumes its operation at a predetermined clock cycle, and the write is completed.

DATA TRANSMISSION FROM SUB-CPU TO MAIN CPU

I. A command is previously provided from the main CPU, $CPU_M$ to the addressed sub-CPU upon the data transmission, and the sub-CPU is prepared to transmit its data.

II. The main CPU, $CPU_M$ performs a read and, at the same time, the main CPU, $CPU_M$ is waited.

III. In response to the previously received command, the addressed sub-CPU receives the CPU select signal SCTS and provides the data through the associated bilateral buffer BUF2 to the data bus DABU and also provides a signal from its output terminal OUT to the associated OR gate $GAT_1$ to $GAT_n$ to have the wait clear signal CLRS provided to the main CPU.

Figure 2:
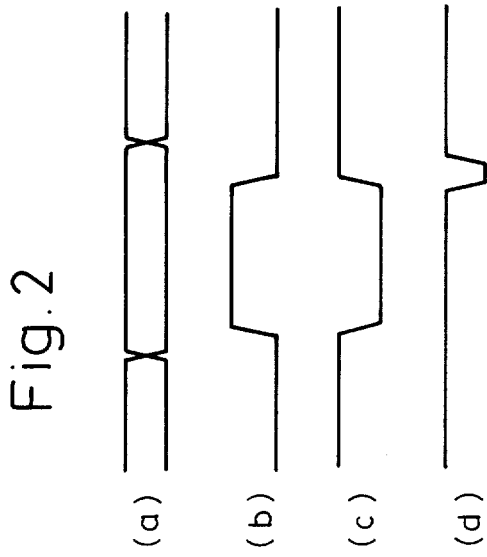
FIG. 2 shows waveforms of signals appearing at various points in data transmission system of FIG. 1.

IV. The main CPU, $CPU_M$ is thereby released from the waited state and resumes its operation to read the data. Here, the signals are shown in FIG. 2 in the negative logic.

According to another feature of the present invention, the latch circuit is arranged to ensure a more reliable operation. That is, the arrangement of FIG. 1 is satisfactory so long as the wait clear signal CLRS is always properly transmitted from the sub-CPU side to the main CPU side, but, in practice, it is necessary to take into consideration such a possibility that the wait clear signal CLRS is not always properly generated. For example, the address decoder DEC for the generation of the CPU select signal SCTS is usually provided with the capability to decode a larger number than the actually installed number of the boards and sub-CPU's in view of a possible future expansion or modification of the system, so that any presence of error in the control program may happen to cause such a wrong operation of the system that the data is transmitted to a board that is actually not installed. Furthermore, it is also considered possible that some other circuit than the main CPU is partly involved in a problem resulting in no generation of the wait clear signal CLRS, in which event the main CPU is caused to be maintained as waited so as not to do any operation.

Figure 3:
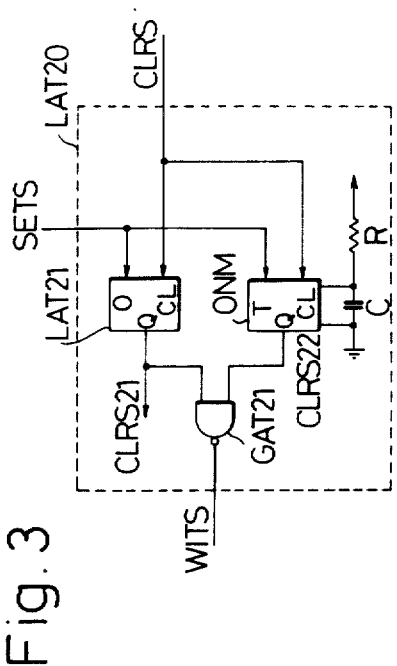
FIG. 3 is a circuit arrangement of a practical embodiment of a latch circuit used in the data transmission system of FIG. 1.
Figure 4:
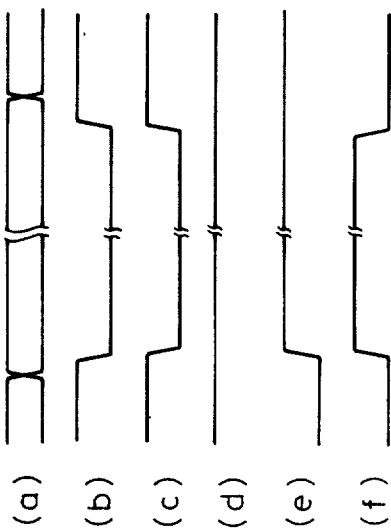
FIG. 4 shows waveforms of signals appearing at various points in the latch circuit of FIG. 3.

Referring now to FIG. 3, a latch circuit LAT20 shown is designed to have the foregoing feature of the present invention, in which, upon transmission of such data as shown in FIG. 4(a), a wait set signal SETS such as shown in FIG. 4(b) is provided from the address decoder DEC simultaneously to a data input terminal D of a latch element LAT21 and to a trigger terminal T of a one-shot multivibrator ONM. Furthermore, a wait clear signal CLRS such as shown in FIG. 4(d) is provided from the addressed sub-CPU simultaneously to a clear terminal CL of the latch element LAT21 and to a clear terminal CL of the multivibrator ONM. The latch element LAT 21 and one-shot multivibrator ONM are connected at their output terminals Q, respectively to each of a pair of input terminals of a NAND gate GAT21, and such a wait signal WITS as shown in FIG. 4(c) is provided at the output terminal of the NAND gate GAT21.

In an event when, for example, data is caused to be transmitted to a sub-CPU not actually installed in the above arrangements, the wait clear signal CRLS or FIG. 4(d) is kept, for example, at its high level, the one-shot multivibrator ONM is started simultaneously with the receipt of the wait set signal SETS of FIG. 4(b) and, after a predetermined time interval, the wait clear signal CLR 22 provided out of the multivibrator ONM to the NAND gate GAT21 is made to be a low level as shown in FIG. 4(f), whereby the wait signal WITS provided out of the NAND gate GAT21 is made positively to be at high level as will be clear from FIG. 4(c), that is, the wait signal is caused to disappear. When, on the other hand, the wait clear signal CLRS is normally transmitted from the addressed sub-CPU, that is, when the latch element LAT21 and one-shot multivibrator ONM receive a low level input, they are both cleared, and the NAND gate GAT21 provides a low level output so that the wait signal WITS will be at a high level to disappear. When the latch element LAT21 receives normally the wait clear signal CLRS, the output wait clear signal CLRS21 of the latch element LAT21 shifts to its low level but, in a state where the wait clear is forcibly performed by the one-shot multivibrator ONM, the wait clear signal CLRS21 shifts to a high level. Therefore, a proper detection of the output wait clear signal CLRS21 of the latch element LAT21 makes it possible to judge whether or not the data transmission is being effectively performed between the addressed sub-CPU and the main CPU.

According to a further feature of the present invention, means are provided for ensuring that the wait clear signal is prevented from being unnecessarily transmitted continuously from the sub-CPU side. While no problem should arise so long as the wait clear signal CLRS is transmitted in normal manner from the sub-CPU side, there may be such a possibility that any arbitrary running takes place on, for example, the sub-CPU side so as to cause the wait clear signal CLRS to be continuously transmitted. On such an occasion, the main CPU, which is likely to be shifted through the latch circuit LAT to the waited state after the write operation, will be immediately cleared due to the wait clear signal CLRS being continuously provided to the latch circuit LAT, so that the main CPU will falsely judge that the data transmission has been completed in a short time so as to have a useless data transmission repeated intermittently.

Figure 5:
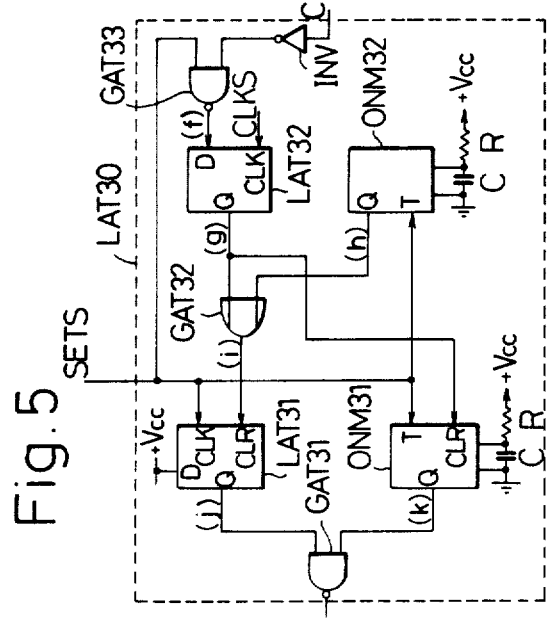
FIG. 5 is a circuit arrangement of another practical embodiment of the latch circuit used in the data transmission system of FIG. 1.

Shown in FIG. 5 is a latch circuit LAT30 embodying the said further feature of the present invention, in which the wait set signal SETS is provided, upon the data transmission, from the address decoder DEC simultaneously to a clock terminal CLK of a first latch element LAT31 and to a trigger terminal T of a first one-shot multivibrator ONM31, while the first latch element LAT31 and one-shot multivibrator ONM31 are connected at their output terminal Q to each of a pair of input terminals of a first NAND gate GAT31 which provides the wait signal WITS at the output terminal. The first latch element LAT31 is also connected at its data input terminal D to the positive side of a power source, and an output at the output terminal Q of the first latch element LAT31 is made a high level upon rising of the wait set signal to the clock terminal CLK and is kept at the high level until the first one-shot multivibrator ONM31 receives a low level input at its clear terminal CLR. The wait set signal SETS is also provided simultaneously to a trigger terminal T of a second one-shot multivibrator ONM32, so that the first and second one-shot multivibrators ONM31 and ONM32 will concurrently operate with a positive trigger to provide high level signals for a time determined by a time constant of an RC circuit of a resistor R and capacitor C. The first one-shot multivibrator ONM31 resets to the original state in response to the low level signal received at clear terminal CLR.

The wait clear signal CLRS transmitted from the addressed sub-CPU is provided through an inverter INV to one of a pair of input terminals of a second NAND gate GAT33 which also receives the wait set signal SETS at the other input terminal. The second NAND gate GAT33 is connected at its output terminal to a data input terminal D of the second latch element LAT32 which receives at a clock terminal CLK the clock signal CLKS from the main CPU, so that a latching operation of the second latch element LAT32 will be achieved upon positive rising of the clock signal CLKS. Furthermore, the second latch element LAT32 is connected at its output terminal Q to one of two input terminals of an OR gate (or AND gate in the negative logic) GAT32, the other input terminal of which is connected to an output terminal Q of the second one-shot multivibrator ONM32, and an output of the OR gate GAT32 is provided to a clear terminal CLR of the first latch element LAT31. The output terminal Q of the second latch element LAT32 is connected to the clear terminal CLR of the first one-shot multivibrator ONM31 to provide the low level signal for the reset of this multivibrator.

In the foregoing latch circuit LAT30, it is preferable that set time $t_1$ and $t_2$ for the first and second one-shot multivibrators ONM31 and ONM32 are set to be several hundred usec and several usec, respectively. In other words, the set time $t_1$ for the first one-shot multivibrator ONM31 is set to be sufficiently longer than a time from the reception of the wait set signal SETS to the reception of the wait clear signal CLRS during normal generation of the latter signal CLRS, whereas the set time $t_2$ for the second one-shot multivibrator ONM32 is sufficiently shorter than the time, so that any low level state of the wait clear signal CLRS during in particular the set time $t_2$ for the second one-shot multivibrator ONM32 can be judged as being the condition where arbitrary running took place on the sub-CPU side, while any high level state of the wait clear signal CLRS kept even after termination of the set time $t_1$ for the first one-shot multivibrator ONM31 can be determined to be an addressing made to an unstalled sub-CPU or a problem which occurred at a part of the circuit. If the wait clear signal CLRS is held at a high level, then the output of the one-shot multivibrator ONM31 is inverted to a low level after a predetermined time interval so that the wait signal WITS can be released. Even under such abnormal condition, the output of the first latch element LAT31 is not cleared and is kept at a high level so that, on the basis of the state of this output, it can be judged whether or not the data transmission performed immediately before has been valid.

Figure 6A:
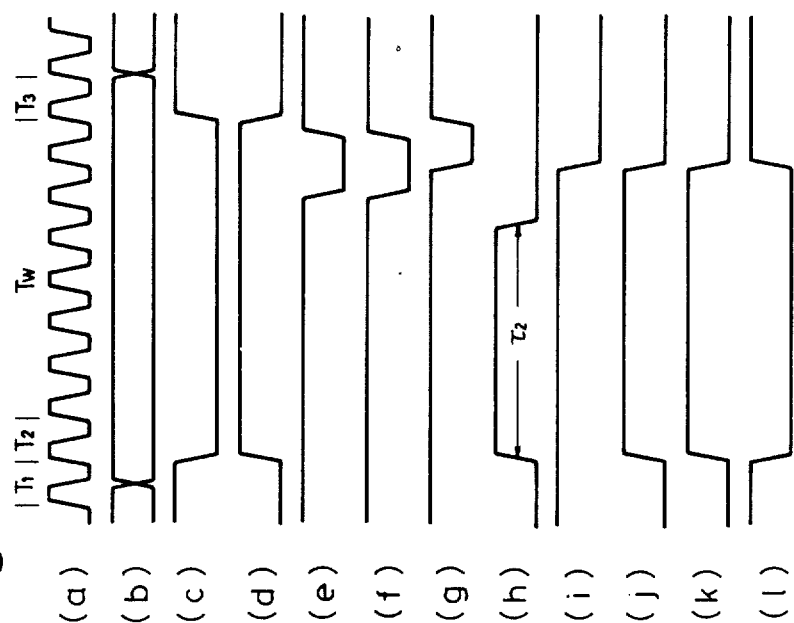
FIGS. 6A to 6C show waveforms of signals appearing at various points in the latch circuit of FIG. 5.
Figure 6B:
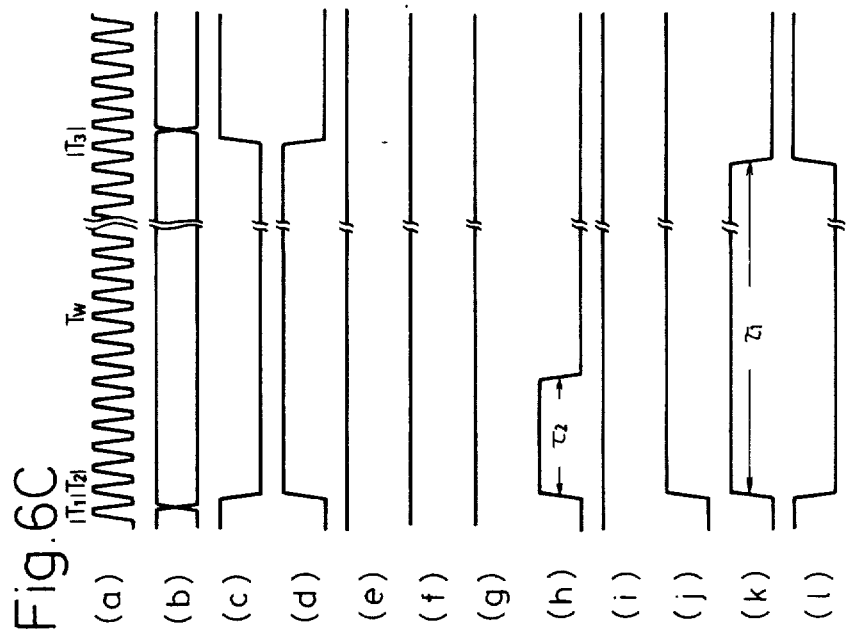
Figure 6C:
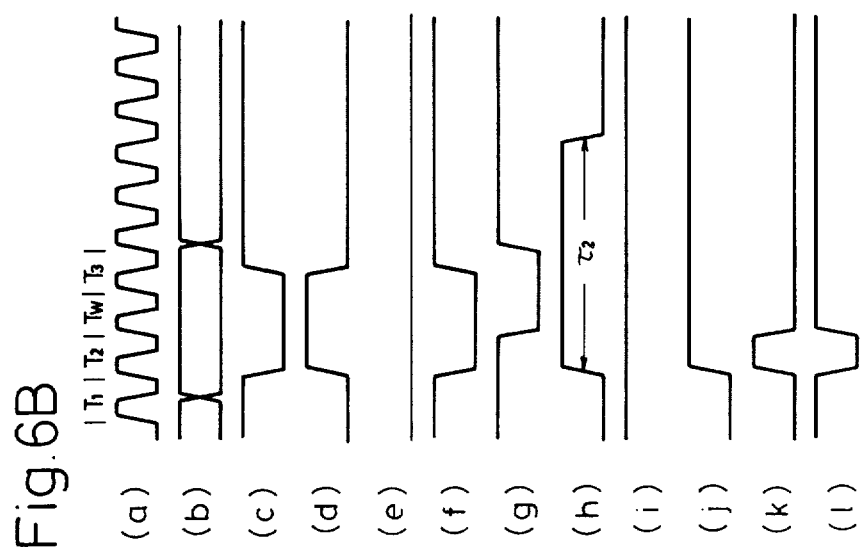

The data transmission performed with the system employing the latch circuit LAT30 of FIG. 5 shall be explained by referring also to FIGS. 6A to 6C. FIG. 6A shows waveforms of signals appearing at various points in the system during normal transmission of the wait clear signal CLRS. Now, when such a clock signal CLKS as shown in FIG. 6A (a) is transmitted from the main CPU, a write data is determined as shown in FIG. 6A (b) in the latter half of a cycle $T_1$, the address for a predetermined sub-CPU is provided in the former half of the next cycle $T_2$, and the CPU select signal SCTS is activated as shown in FIG. 6A (c). Upon generation of one CPU select signal, the wait set signal SETS is activated as shown in FIG. 6A (d) and is provided through the address decoder DEC to the clock terminal CLK of the first latch element LAT31 in the latch circuit LAT30 and also to the respective trigger terminals T of the first and second one-shot multivibrators ONM31 and ONM32, and to the first latch element LAT31. First and second one-shot multivibrators ONM31 and ONM32 then generate high level output signals at their output terminals Q respectively as shown in FIG. 6A (j), (k) and (h) to activate the wait signal WITS sent from the NAND gate GAT 31 as shown in FIG. 6A (1), consequent on which the main CPU is put in a wait cycle $T_2$.

In the second NAND gate GAT33 of the latch circuit LAT30, on the other hand, "NAND" between the wait set signal SETS and the wait clear signal CLRS inverted through the inverter INV is taken, and such an output signal as shown in FIG. 6A (f) is provided. The second latch element LAT32 receives the output signal (f) of the gate GAT33 upon rising of the clock signal CLKS of FIG. 6A (a) provided to the clock terminal CLK of the element, but this output signal (f) is kept at high level as seen in FIG. 6A (g) until the element receives the wait clear signal CLRS as in FIG. 6A (e), so that no clear signal will be provided to the clear terminal CLR of the first one-shot multivibrator ONM 31. As the output of the OR gate GAT32 is also at a high level as in FIG. 6A (i), the first latch element LAT31 receives no clear signal at its clear terminal CLR.

Since the set time $t_2$ of the second one-shot multivibrator ONM31 is set to be sufficiently shorter than the return transmission time of the wait clear signal CLRS from the sub-CPU, the output signal of this multivibrator ONM32 is reset to a low level prior to the activation of the wait clear signal CLRS as in FIG. 6A (h), so that an output signal (i) of the OR gate GAT32 will be at a low level. After this, the second NAND gate GAT33 receives the wait clear signal CLRS as shown in FIG. 6A (e) from the sub-CPU, upon which the output signal of this gate shifts to a low level as in FIG. 6A (f), and the output signal (g) of the second latch element LAT32 also shifts to a low level upon rising of the subsequent clock signal CLKS. Accordingly, the first one-shot multivibrator ONM31 is cleared, and the first latch element LAT31 is also cleared through the OR gate GAT32, whereby the output of the first NAND gate GAT31 is reset to a high level as in FIG. 6A (1) and the wait signal WITS is released. With this release of the wait, the CPU select signal is caused to disappear as in FIG. 6A (c) in subsequent cycle T₃ of the clock signal of FIG. 6A (a) and the data transmission disappears with the termination of the cycle T₃.

FIG. 6B shows waveforms of signals appearing at various points during continuous transmission of the wait clear signal from the sub-CPU due to its arbitrary running or the like, in which the signal waveforms (a) to (1) appear at the same points as the signal waveforms (a) to (1) of FIG. 6B, as will be readily appreciated. In the present latch circuit LAT30, in the case in particular of the arbitrary running of the sub-CPU, the output as in FIG. 6B (f) of the second NAND gate GAT33 is caused to vary in response to such wait set signal WETS as in FIG. 6B (d). The output as in 6B (g) of the second latch element LAT32 shifts to low level upon rising of the subsequent clock signal CLKS of FIG. 6B (a) to clear the first one-shot mutivibrator ONM31, and the output signal (k) which has shifted to a high level with the rising of the wait set signal SETS is caused to immediately shift to a low level, whereupon the wait signal WITS of FIG. 6B (1) shifts to high level to be released. On the other hand, the OR gate GAT32 receives at one of the input terminals a high level input during receipt at the other input terminal of the signal from the second one-shot multivibrator ONM32, so as to be guarded for allowing no low level signal to pass therethrough, and thus the first latch element LAT31 will not be cleared. Accordingly, a proper detection of such output signal as in FIG. 6B (j) of the first latch element LAT31 makes it possible to judge whether or not the data transmission is effectively executed between the main CPU and the addreseed sub-CPU.

FIG. 6C shows waveforms of signals appearing at various points when the wait clear signal CLRS does not reach the latch circuit LAT30 for such reason as a false addressing of the main CPU to an uninstalled sub-CPU, or, a problem occurring in a part of any other circuit than the main CPU or the like. Signal waveforms (a) to (1) are the ones appearing at the same points as the signal waveforms (a) to (1) of FIG. 6A when, in particular, the wait clear signal is not provided to the latch circuit LAT30 within a predetermined time. In the present latch circuit LAT30, the output level of the first one-shot multivibrator ONM31 is inverted to a low level as shown in FIG. 6C (k) upon termination of the set time t₁ sufficiently larger than the normal generation time of the wait clear signal CLRS, whereby the output signal of the first NAND gate GAT31 as shown in FIG. 6C (1), i.e., the wait signal WITS is forcibly shifted to a high level to release the wait. In this case, too, the first latch element LAT31 is not cleared, and a proper detection of the output signal as in FIG. 6C (j) of the first latch element LAT31 makes it possible to judge whether or not the data transmission is effectively executed between the main CPU and the addressed sub-CPU.

What is claimed as our invention is:

1. A data transmission system between a plurality of CPU's in a key telephone system comprising:
    a main board on which a main CPU and a latch circuit are installed;
    a plurality of sub-boards, each of said sub-boards having both a gate circuit and a sub-CPU installed thereon, whereby said gate circuit is connected between said sub-CPU and said main board latch circuit by a wait clear line, such that said latch circuit provides a wait signal to said main CPU upon a read or write of said main CPU with respect to said sub-CPU and said wait clear line provides to said latch circuit a wait clear signal, indicative of completion of input and output of said sub-CPU, to release a waited state of said main CPU;
    said latch circuit further comprising means which generates said wait clear signal independently of said sub-CPU's on said plurality of sub-boards after a predetermined time interval from address setting of said main CPU for the sub-CPU's for releasing said wait of said main CPU, said releasing means including at least a one-shot multivibrator which varies its output level after a predetermined time interval from a receipt of a wait set signal;
    a data bus connected between said main CPU of said main board and said sub-CPU's of said plurality of sub-boards; and,
    a CPU select line connected to said sub-CPU's for sending a CPU select signal from said main CPU to a selected one of said sub-CPU's;
    wherein data and command transmission is performed through said read or write of said main CPU.

2. A system according to claim 1, wherein said main board further includes a bilateral buffer installed thereon and connected between said main CPU and said data bus; and,
    each of said plurality of sub-boards includes a bilateral buffer installed thereon and being connected between said sub-CPU installed on each of said plurality of sub-boards with said data bus.

3. A system according to claim 1, wherein each said gate circuit is an AND gate in negative logic.

4. A system according to claim 2, which further comprises an address decoder installed on said main board and connected between said latch circuit and said bilateral buffer on the main board.

5. A system according to claim 1, wherein said wait releasing means further includes at least a latch element which receives said wait set signal simultaneously with said one-shot multivibrator, said latch element varying its output level only upon normal receipt of said wait clear signal, and a gate circuit which receives outputs of said one-shot multivibrator and said latch element for transmitting a wait release signal.

6. A system according to claim 5, wherein said gate circuit for transmitting said wait release signal is a NAND gate circuit.

7. A system according to claim 1, wherein said latch circuit includes means for insuring a prevention of continuous transmission of said wait clear signal from each of said sub-CPU's.

* * * * *